United States Patent Office 3,337,577
Patented Aug. 22, 1967

3,337,577
PROCESS FOR THE PREPARATION OF
N-VINYL-IMIDAZOLE COMPOUNDS
Natsuo Sawa and Shigeru Okamura, Kitajima-machi,
Itano-gun, Japan, assignors to Toho Rayon Kabushiki
Kaisha, Nihombashi, Chuo-ku, Tokyo, Japan, a corporation of Japan
No Drawing. Filed Aug. 29, 1963, Ser. No. 305,537
Claims priority, application Japan, Sept. 7, 1962,
37/38,156
5 Claims. (Cl. 260—309)

This invention relates to a process for the preparation of N-vinyl-imidazole compounds by reacting imidazole compounds with acetylene under high pressure in an alcoholic mixture solvent in the presence of a catalyst.

Heretofore dioxane has been used as a solvent for producing N-vinyl imidazoles with acetylene in the presence of an alkali metal salt of an imidazole compound as a catalyst on the ground that the solvent should be inactive to the starting materials and be able to dissolve not only the starting materials but also the catalyst and a polymerization inhibiting agent. However, the dissolving power of dioxane relative to the catalyst is not sufficient. Under room temperature conditions before and after reaction, a part of the catalyst is let free from the reaction system so that the solution becomes nonhomogeneous which causes the following disadvantages. Namely, the catalyst is not sufficiently dissolved in the reaction system at room temperature, before commencing reaction so that continuous vinylation can not be carried out well. After finishing the reaction, the part of the catalyst which freed and deposited is apt to stick to the reaction vessel so that it is difficult to remove same.

Alcohols were considered in view of their high dissolving power relative to the catalyst. However, there has been no report on the use of alcohols as a solvent. This was due to fear of formation of by-products, vinyl ethers, which are formed from alcohols and acetylene.

A series of experiments were carried out using as a catalyst an alkali metal salt of the imidazole compounds to be vinylated which is represented by either of following formulas,

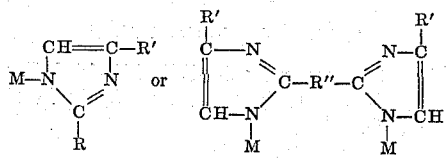

wherein R represents hydrogen, and aliphatic or aromatic substituent groups; R' represents hydrogen or aliphatic substituent groups; R'' represents bifunctional aliphatic or aromatic substituent groups; M means alkali metal. As a result of said experiments, it was found that when alcohols are used as solvent together with dioxane a homogeneous reaction solution is formed and the objective compounds can be obtained at high yield in the range of 95–99% without forming undesirable by-products, viz., vinyl ether as shown hereinafter in the tables.

The reaction mechanism is shown as follows:

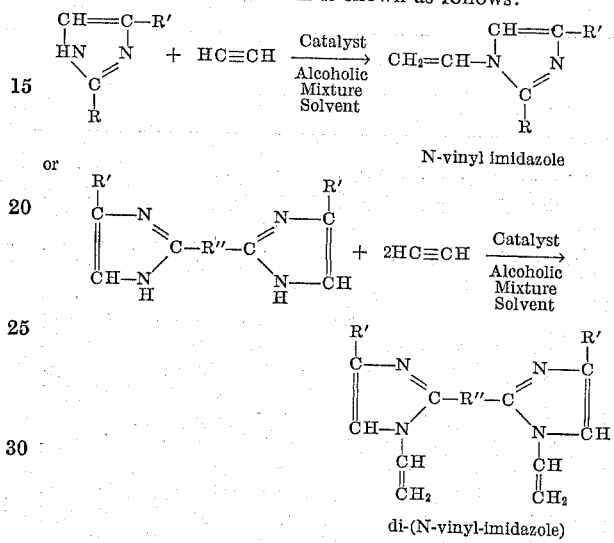

TABLE 1

| Solvent | Reaction Time (hr.) | Yield (percent) 2-methyl-1-vinyl-imidazole | Condition of Solution | |
|---|---|---|---|---|
| | | | Before Reaction | After Reaction |
| Dioxane (60 cc.) alone | 3 | 98.3 | Somewhat not homogeneous. | Somewhat not homogeneous. |
| Dioxane (54.5 cc.) plus Methanol (5.5 cc.) | 3 | 95.1 | Homogeneous | Homogeneous. |
| Dioxane (54.5 cc.) plus Iopropanol (5.5 cc.) | 3 | 98.4 | do | Do. |

The results referred to above were obtained by reacting 24.6 g. of 2-methyl-imidazole with 1.3 times the stoichiometric volume of acetylene under high pressure, at a temperature of 180° C., using 2 g. of the potassium salt of 2-methylimidazole; the table clearly shows that a mixed solvent consisting of dioxane and alcohol causes a better result from the viewpoint of dissolving power than that of dioxane alone. It has been confirmed that 2-methyl-1-vinylimidazole obtained using said mixture solvent contains no vinyl ether as a result of the fractional distillation and infrared absorption spectrum.

The result obtained by using alcohols as a solvent, under the same conditions as referred to in connection with Table 1, is given in Table 2.

TABLE 2

| Solvent | Reaction Time (hr.) | Yield (percent) 2-methyl-1-vinyl-imidazole | Condition of Solution | |
|---|---|---|---|---|
| | | | Before Reaction | After Reaction |
| Methanol (60 cc.) only | 3 | 40.4 | Homogeneous | Homogeneous. |
| Isopropanol (60 cc.) only | 3 | 94.4 | do | Do. |

The use of methanol only as solvent is impractical in view of extremely low reaction velocity. However, when isopropanol is used, the reaction velocity and yield of the objective compound are quite satisfactory.

Further experiments were carried out, as shown in Table 3, by using aromatic hydrocarbons such as benzene, toluene which has a lower dissolving power than dioxane relative to the catalyst, together with alcohols.

TABLE 3

| Solvent | Reaction Time (hr.) | Yield (percent) 2-methyl-1-vinyl-imidazole | Condition of Solution | |
|---|---|---|---|---|
| | | | Before Reaction | After Reaction |
| Toluene (60 cc.) alone | 4 | 42.9 | Not homogeneous. | Not homogeneous. |
| Toluene (54.5 cc.) plus Methanol (5.5 cc.) | 4 | 96.7 | Homogeneous | Homogeneous. |
| Toluene (54.5 cc.) plus Isopropanol (5.5 cc.) | 4 | 98.1 | do | Do. |

The results were obtained under the same conditions as referred to inrelation with Table 1 except for the solvent.

Thus, according to the present invention there is provided a process for the manufacture of N-vinyl-imidazole compounds in which an imidazole compound is reacted with acetylene in the presence of an alkali metal salt of said imidazole compound as a catalyst characterized in that said reaction is carried out in a solvent comprising isopropanol alone or a mixture of a lower alcohol and dioxane or with an aromatic hydrocarbon.

It is preferable that said mixed solvent comprises 5–20% by weight of alcohol to the other solvent.

As a catalyst, a potassium salt of said imidazole compound is preferable. In practice, caustic alkali or alkali metal alcoholate may be added to the reaction system. If desired a polymerization inhibitor such as hydroquinone is added thereto. The reaction is carried out by shaking the autoclave containing the reaction system into which acetylene is forced under pressure, at a temperature of 160–200° C. for 3–5 hours.

N-vinyl-imidazole compounds obtained according to this invention shall be enumerated not exclusively as follows:

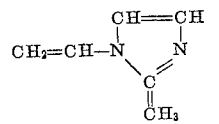

2-methyl-1-vinyl-imidazole

Colourless, transparent liquid, B.P. 57–58° C. (2 mm. Hg); soluble in water and usual organic solvents; polymerizable.
Picrate, M.P. 193–194° C. (methanol).

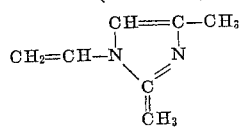

2.4-dimethyl-1-vinyl-imidazole

Colourless, transparent liquid, B.P. 67–68° C. (3 mm. Hg); soluble in water and usual organic solvents; polymerizable.

Picrate, M.P. 181–182° C. (methanol).

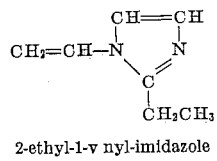

2-ethyl-1-vinyl-imidazole

Colourless, transparent liquid, B.P. 68–69° C. (2.5 mm. Hg); soluble in water and usual organic solvents; polymerizable.
Picrate, M.P. 171–172° C. (methanol).

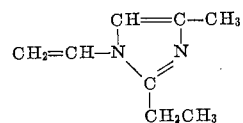

2-ethyl-4-methyl-1-vinyl-imidazole

Colourless, transparent liquid, B.P. 76–77° C. (2.5 mm. Hg); soluble in water and usual organic solvents; polymerizable.
Picrate, M.P. 190–191° C. (methanol).

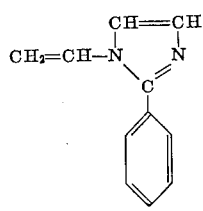

2-phenyl-1-vinyl-imidazole

Colourless, transparent liquid, B.P. 140–145° C. slightly soluble in water and freely in alcohols; polymerizable.
Picrate, M.P. 159–160° C. (methanol).

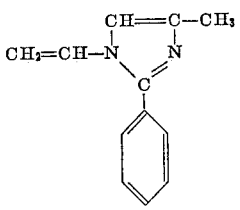

4-methyl-2-phenyl-1-vinyl-imidazole

Colourless, transparent liquid, B.P. 140–145° C. (2 mm. Hg); slightly soluble in water and freely in alcohols; polymerizable.

Picrate, M.P. 97–98° C. (methanol).

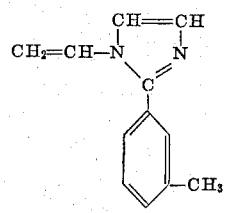

2-(m-methyl-phenyl)-1-vinyl-imidazole

Colourless, transparent liquid, B.P. 145–150° C. (2 mm. Hg); slightly soluble in water and freely in alcohols; polymerizable.
Picrate, M.P. 144–145° C. (methanol).

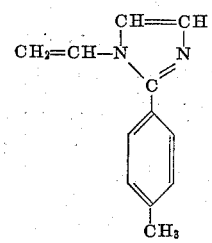

2-(p-methyl-phenyl)-1-vinyl-imidazole

Colourless, transparent liquid, B.P. 145–150° C. (2 mm. Hg); slightly soluble in water and freely in alcohol; polymerizable.
Picrate, M.P. 158–159° C. (methanol).

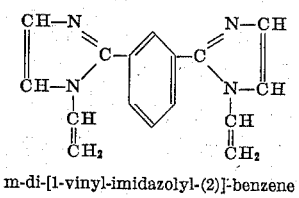

m-di-[1-vinyl-imidazolyl-(2)]-benzene

Colourless, transparent viscous liquid, B.P. 200–210° C. (2 mm. Hg); slightly soluble in water and freely in alcohols; polymerizable.
Picrate, M.P. 172–173° C. (methanol).

Example 1

24.6 gr. (0.3 mol) of 2-methyl-imidazole, 2 gr. potassium salt of 2-methyl-imidazole and 0.2 gr. of hydroquinone were dissolved in a mixed solvent comprising 54.5 cc. of dioxane and 5.5 cc. of methanol in the autoclave, into which 0.39 mol of acetylene was forced under pressure. After reacting for three hours at a temperature of 180° C., the solvent was distilled off under reduced pressure from the reaction mixture. Then, 30.8 gr. 2-methyl-1-vinylimidazole was obtained through distillation in vacuo at a yield of 95.1%.

Example 2

A similar amount of 2-methyl-imidazole, a potassium salt thereof and hydroquinone were dissolved in a mixed solvent comprising 54.5 cc. of dioxane and 5.5 cc. of isopropanol in the autoclave, into which similar amount of acetylene was forced under pressure. After the solution was treated at a temperature of 180° C. for three hours, 31.9 gr. of 2-methyl-1-vinyl-imidazole was obtained through distillation in vacuo in the yield of 98.4%.

Example 3

A similar amount of 2-methyl-imidazole, a potassium salt thereof and hydroquinone were dissolved in the solvent mixture comprising 54.5 cc. of benzene and 5.5 cc. of methanol in the autoclave, into which a similar amount of acetylene was forced under pressure. After reaction at a temperature of 180° C. for four hours, 31.0 gr. of 2-methyl-1-vinyl-imidazole was obtained by distillation in vacuo in the yield of 95.7%.

Example 4

A similar amount of 2-methyl-imidazole, a potassium salt thereof and hydroquinone were dissolved in the solvent mixture comprising 54.5 cc. of benzene and 5.5 cc. of isopropanol in the autoclave, into which a similar amount of acetylene was forced under pressure. After reaction at a temperature of 180° C. for three hours, 31.5 gr. of 2-methyl-1-vinyl-imidazole was obtained through distillation in vacuo in the yield of 97.2%.

Example 5

A similar amount of 2-methyl-imidazole, a potassium salt, thereof and hydroquinone were dissolved in the solvent mixture comprising 54.5 cc. of toluene and 5.5 cc. of methanol in the autoclave, into which, a similar amount of acetylene was forced under pressure. After reaction at a temperature of 180° C. for four hours, 31.6 gr. of 2-methyl-1-vinyl-imidazole was obtained through distillation in vacuo in the yield of 96.7%.

Example 6

Under similar conditions, the solvent comprising 60 cc. of isopropanol only was used. Through treatment at a temperature of 180° C. for three hours, 30.6 gr. of 2-methyl-1-vinyl-imidazole was obtained in the yield of 94.4%.

Example 7

Under similar conditions, the solvent comprising 54.5 cc. of dioxane and 5.5 cc. of isopropanol was used. Through treatment at a temperature of 160° C. for four hours, 31.9 gr. of 2-methyl-1-vinyl-imidazole was obtained in the yield of 98.4%.

Example 8

Under similar conditions, the solvent mixture comprising 54.5 cc. of benzene and 5.5 cc. of isopropanol was used. Through treatment at a temperature of 160° C. for five hours, 31.4 gr. of 2-methyl-1-vinyl-imidazole was obtained in the yield of 96.9%.

Example 9

28.9 gr. (0.3 mol) of 2.4-dimethyl-imidazole, 2 gr. of potassium salt thereof and 0.2 gr. of hydroquinone were dissolved in the solvent mixture comprising 54.5 cc. of dioxane and 5.5 cc. of methanol in the autoclave, into which 0.39 mol of acetylene was forced under pressure. After treatment at a temperature of 180° C. for three hours, 35.6 gr. of 2.4-dimethyl-1-vinyl-imidazole was obtained similarly by distillation in vacuo in the yield of 97.0%.

Example 10

28.9 gr. (0,3 mol) of 2-ethyl-imidazole, 2 gr. of potassium ethylate and 0.2 gr. of hydroquinone were dissolved in the solvent mixture of 54.5 cc. of dioxane and 5.5 cc. of ethanol in the autoclave, into which 0.39 mol acetylene was forced under pressure. After the solution was treated at a temperature of 180° C. for three hours, 33.1 gr. of 2-ethyl-1-vinyl-imidazole was obtained by distillation in vacuo in the yield of 90.2%.

Example 11

33.0 gr. (0.3 mol) of 2-ethyl-4-methyl-imidazole, 2 gr. of potassium hydroxide and 0.2 gr. of hydroquinone were dissolved in the solvent mixture comprising 54.5 cc. of dioxane and 5.5 cc. of isopropanol in the autoclave, into which acetylene was similarly dissolved. After reaction at a temperature of 180° C. for three hours, 35.0 gr. of 2-ethyl-4-methyl-1-vinyl-imidazole was obtained by distillation in vacuo in the yield of 85.7%.

Example 12

43.2 gr. (0.3 mol) of 2-phenyl-imidazole, 2 gr. of potassium salt thereof and 0.2 gr. of hydroquinone were dissolved in the solvent mixture of 50 cc. of dioxane and 10 cc. of isopropanol in the autoclave, into which acetylene was similarly forced. After treatment at a temperature of 200° C. for four hours, 49.5 gr. of 2-phenyl-1-vinyl-imidazole was obtained by distillation in vacuo in the yield of 97.1%.

*Example 13*

47.4 gr. (0.3 mol) of 4-methyl-2-phenyl-imidazole, 2 gr. of potassium salt thereof and 0.2 gr. of hydroquinone were dissolved in the similar solvent mixture as in Example 12. After treatment at a temperature of 200° C. for five hours, 51.3 gr. of 4-methyl-2-phenyl-1-vinyl-imidazole was obtained in the yield of 93.1%.

*Example 14*

47.4 gr. (0.3 mol) of 2-(m-methyl-phenyl)-imidazole, 2 gr. of potassium hydroxide and 0.2 gr. of hydroquinone were dissolved in the similar solvent mixture. After treatment at a temperature of 200° C. for two hours, 47.8 gr. of 2-(m-methyl-phenyl)-1-vinyl-imidazole was obtained in the yield of 86.7%.

*Example 15*

47.4 gr. (0.3 mol) of 2-(p-methyl-phenyl)-imidazole, 2 gr. of sodium hydroxide and 0.2 gr. of hydroquinone were dissolved in the similar solvent mixture. After treatment at a temperature 200° C. for four hours, 45.9 gr. 2-(p-methyl-phenyl)-1-vinyl-imidazole was obtained in the yield of 83.3%.

*Example 16*

31.5 gr. (0.15 mol) of m-di-(2-imidazolyl)-benzene, 2 gr. of potassium salt thereof and 0.2 gr. of hydroquinone were dissolved in the similar solvent mixture. After treatment at a temperature of 200° C. for five hours, 22.3 gr. of m-di-[2-(1-vinyl-imidazolyl)]-benzene was obtained in the yield of 56.7%.

What we claim:

1. In a process for producing a N-vinyl-imidazole compound of the general formula:

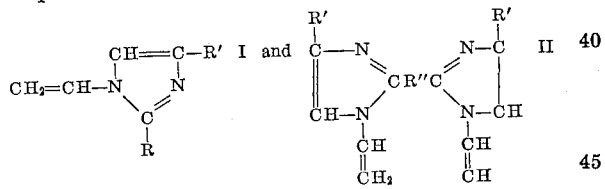

wherein R represents hydrogen, methyl, ethyl, phenyl, or methylphenyl; R' represents hydrogen or methyl: R" represents phenyl, by reacting acetylene with said imidazole compounds in presence of an alkali metal salt thereof as catalyst, the improvement which comprises using as a solvent, a substance selected from the group consisting of isopropanol alone and a mixture of $C_1-C_3$ lower alcohols with dioxane, with toluene, and/or with benzene.

2. The process as set forth in claim 1 characterized in that said acetylene is forced under pressure into the autoclave containing the solution of said imidazole compound in said solvent with said catalyst and thus obtained solution is heated while being shaken at a temperature of 160–200° C. for three to five hours.

3. The process as set forth in claim 2 characterized in the said solvent mixture comprises 5–20% by weight of alcohol to another solvent.

4. The process as set forth in claim 2 characterized in that said alkali metal is selected from the group consisting of sodium and potassium.

5. The process as set forth in claim 2 characterized in that a polymerization inhibitor such as hydroquinone is added to the reaction system.

References Cited

UNITED STATES PATENTS

| 2,066,160 | 12/1936 | Reppe et al. | 260—315 |
| 2,123,733 | 7/1938 | Keyssner | 260—315 |
| 2,123,734 | 7/1938 | Keyssner et al. | 260—315 |
| 2,472,085 | 6/1949 | Beller et al. | 260—315 |

FOREIGN PATENTS 37-2338  5/1962  Japan.

OTHER REFERENCES

Reppe et al.: Liebigs Annalen der Chemie, vol. 601, pp. 128–138 (1956).

WALTER A. MODANCE, *Primary Examiner.*

N. TROUSOF, *Assistant Examiner.*

UNITED STATES PATENT OFFICE
CERTIFICATE OF CORRECTION

Patent No. 3,337,577                                         August 22, 1967

Natsuo Sawa et al.

It is hereby certified that error appears in the above numbered patent requiring correction and that the said Letters Patent should read as corrected below.

Columns 1 and 2, Table 1, first column, line 3 thereof, for "Iopropanol" read -- Isopropanol --; column 4, line 17, for "2-ethyl-1-vnyl-imidazole" read -- 2-ethyl-1-vinyl-imidazole --; column 7, lines 39 to 45, the formula should appear as shown below instead of as in the patent:

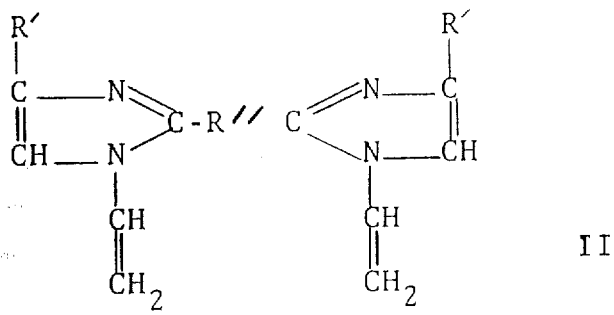

Signed and sealed this 15th day of April 1969.

(SEAL)
Attest:

EDWARD M. FLETCHER, JR.                        EDWARD J. BRENNER
Attesting Officer                                       Commissioner of Patents